United States Patent Office 2,730,548
Patented Jan. 10, 1956

2,730,548
METHOD FOR PRODUCING POLYCYCLIC HYDROCARBONS AND DERIVATIVES THEREOF

Henry Bluestone, Cleveland Heights, Ohio, Samuel B. Soloway, Denver, Colo., Julius Hyman, Coral Gables, Fla., and Rex E. Lidov, Fullerton, Calif., assignors, by mesne assignments, to Shell Development Company, Emeryville, Calif., a corporation of Delaware No Drawing. Application July 20, 1951,
Serial No. 237,844

14 Claims. (Cl. 260—586)

This invention relates to methods for the production of novel hydrocarbon derivatives. More specifically, this invention is concerned with the production of nor-tricyclene and its derivatives by means of wholly unanticipated rearrangement reactions of bicyclo-(2.2.1)-2,5-heptadiene.

While, in the past, an extremely limited number of compounds having the highly condensed ring system of nor-tricyclene have been prepared the compounds thus obtained were limited to the hydrocarbon derivatives having methyl substituents on various carbon atoms making up the ring system. In general, these few available derivatives were obtainable only by means of lengthy, arduous and expensive syntheses which necessarily proceeded from terpene compounds which, themselves, were not easily obtained.

The parent hydrocarbon, nor-tricyclene, was unknown until its preparation in the manner disclosed and claimed in the co-pending application of Silverman and Lidov, Ser. No. 237,842, filed July 20, 1951, and no halogenated, or oxygenated derivatives thereof had ever been preparable.

It is an object of this invention to make available methods for the preparation of nor-tricyclene and its derivatives which are easily carried out and highly economical. Other objects of this invention will become apparent as the process thereof is more fully disclosed.

In general, the process of the present invention involves the addition of a variety of reagents to the hydrocarbon bicyclo-(2.2.1)-2,5-heptadiene. This material, which may be represented by the following planar structural formula,

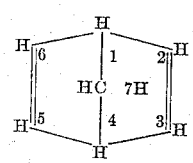

is disclosed and claimed in the co-pending application of Freireich, Hyman and Lidov, Ser. No. 45,574, filed August 21, 1948.

A study of the structure of bicycloheptadiene, as it is set forth in the planar structural formula above, suggests that it will readily react with a variety of reagents such as, for example, the halogens, the halogen acids, and, in the presence of suitable catalysts, water, the alcohols, organic acids, etc., losing, as it so reacts, first one and then the second of its double bonds.

The reactions which would be anticipated on the basis of the knowledge in the prior art may be represented by the reaction equations which follow:

A
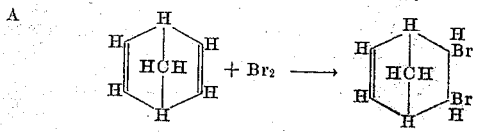

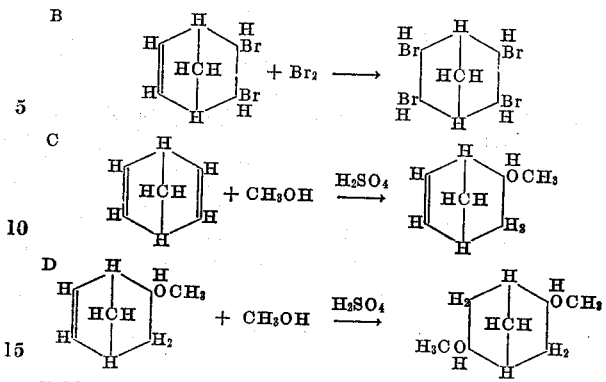

While the second entering methoxy group is illustrated as attached in the "5" position it might equally well have been shown in the "6" position since no information as to its "normal" site of attachment is available for the reaction shown.

Altogether unexpectedly, therefore, in view of the reactions anticipated, it has been found that reactions of the type discussed and illustrated actually proceed to yield largely nor-tricyclene derivatives.

Nor-tricyclene may be represented by the following planar structural formula:

It is clear from the above structure that nor-tricyclene may be considered to contain one cyclopropane ring (carbon atoms 1, 2 and 6), two cyclopentane rings (carbon atoms 1, 2, 3, 4 and 7, and carbon atoms 1, 6, 5, 4 and 7), one bridge head carbon atom, carbon atom 4, and three methano bridges, carbon atoms 3, 5, and 7, the latter serving to connect the bridge head, carbon atom 4, with carbon atoms 2, 6 and 1, respectively, of the cyclopropane ring. It is less evident from the planar structure shown, but it should, none the less, be noted, that the molecule is symmetrical around the bridge head carbon atom 4 which is perpendicularly located above the geometric center of the cyclopropane ring.

It is at once evident that the production of nor-tricyclene from bicycloheptadiene involves a hitherto unknown rearrangement of the carbon structure of the latter compound, of a type which could not be anticipated on the basis of any teachings of the prior art.

In the light of the teaching of the present invention the two reactions "A" and "C," previously shown, may now be rewritten as follows:

The rearrangement appears to involve an unusual interaction between the two double bonds of the bicycloheptadiene ring system. In general, it is well known that two double bonds in 1,3 or conjugative relationship so interact that reagents added to a molecule containing such a double bond system may be added either directly to the two ends of one double bond or to the two ends of the conjugated double bond system. This is illustrated by the following reaction, between butadiene-1,3 and bromine:

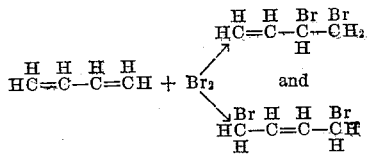

However, the prior art teaches that in a system containing two double bonds in 1,4 relationship, such for example, as that in 1,4-pentadiene, each double bond behaves essentially as though it were the only double bond in the molecule.

In view of these facts, the present discovery that the 1,4 double bonds in bicycloheptadiene add reagents in a fashion previously believed to occur only with 1,3 double bonds, with concomitant rearrangement of the ring system, is wholly unexpected.

The derivatives of nor-tricyclene with the production of which this present invention is primarily, but not exclusively, concerned, are those containing substituents in the 3, and in the 3 and 5 position.

The reactions involved in producing these compounds are readily carried out by adding suitable reactants to bicycloheptadiene in the presence, where necessary, of a suitable catalyst. The reaction can be carried out either in the presence of a solvent, in an excess of the bicycloheptadiene, in an excess of the reagent being added. The reactions may also be conducted in a multiphase system in which the bicycloheptadiene is in one phase and the reagent being added thereto is in a second phase. Such heterogeneous phase reactions usually require, as might be expected, adequate agitation. The reactions here being discussed may be carried out at temperatures ranging from about 0° C. to about 150° C. Pressure is not critical, but where the added reagent is low boiling or gaseous, or where temperatures higher than those reached by the boiling reactants are desired, the use of pressures higher than atmospheric will be advantageous.

The illustrative examples which follow will more fully demonstrate the reagents which may be employed but before considering such specific illustrative material it will be advantageous briefly to set forth the presumable reaction mechanism which it is believed leads to the unusual results obtained. While this invention is not predicated on the accuracy of the mechanism hereinafter set forth, consideration of that mechanism will aid in defining the nature of the reagents which can be employed to realize the process here disclosed.

For illustrative purposes, the reaction of bicycloheptadiene with chloroacetic acid will be discussed. Chloroacetic acid has been found to be a sufficiently strong acid to react with bicycloheptadiene in the absence of a catalyst, and it is believed that the following reactions are involved (it should be noted that the products enclosed in square brackets are postulated intermediates, not necessarily capable of isolation):

1. 

2. 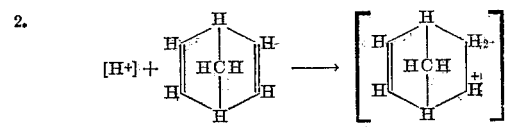

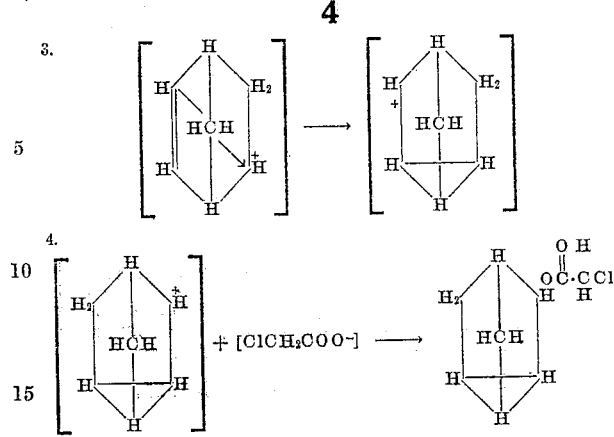

In the case thus indicated, the postulated mechanism involves the addition to one of the double bonds of bicycloheptadiene of a proton with the resultant formation of a carbonium ion which rearranges to yield the ultimate nor-tricylene derivative.

From one point of view, the reaction is a normal attack on a reactive double bond in which rearrangement occurs during the course of the reaction; as a result, the new process could be initiated by the systems which aid additions to double bond systems, so that all of the substances which ordinarily can be added to reactive double bonds should be utilizable.

Organic chemists have long believed that the addition of the halogens chlorine, bromine and iodine, to the carbon=carbon double bond proceeds via the addition of a positive halogen entity to one of the carbons of the double bond system, followed by reaction completion by addition of a negatively charged halogen species to the remaining carbon atom of the erstwhile double bond. Such an addition of a halonium ion to a double bond system necessarily leads to the intermediate formation of a carbonium ion. Without discussing the validity of this theoretical conception, it will suffice to say that the addition of the halogens and of hypohalous acids to bicycloheptadiene has led to the formation of 3,5-nortricyclyl derivatives and the mechanism of such reactions can be postulated in exactly the same manner as was done above for the addition of chloroacetic acid.

Many classes of organic substances can be caused to add to olefinic bonds: the mechanism usually postulated for these additions again involves the formation of an intermediate carbonium ion despite the fact that the substances added can give rise either to no ionized proton or to amounts insufficient to cause the addition to go forward. In such cases, a variety of acidic substances can be employed as catalysts for the reaction. These catalysts are either strong acids, in the ordinary sense, or strong acids in a more generalized sense. Thus, they may be materials such, for example, as sulfuric acid or phosphoric acid or strong "generalized acids" such, for example, as $BF_3$, $Al_2Cl_6$, $SnCl_4$, $ZnCl_2$, etc. In the presence of such catalytic substances, water, the weak organic acids, the alcohols, etc., can be caused to add to olefinic bonds. The basis of the selection of an appropriate catalyst in any particular case is subject to fairly simple and obvious rules already well known to organic chemists. Thus, for example, the hydrolysable salts listed above are not suitably employed in aqueous solutions or with the relatively acidic organic compounds. On the other hand, as is already well known, these same salts are particularly advantageous when it is desired to add substances such as the aromatic hydrocarbons or acyl halides to the olefinic bonds.

Thus, it has been found in accordance with the present invention that the classes of compounds just discussed can be caused to react with bicycloheptadiene to yield nor-tricyclyl derivatives in the presence of catalysts of the type set forth and exemplified in the preceding paragraph.

In summary, then, it can be stated that the present invention comprehends the formation of nor-tricyclyl derivatives containing a substituent in at least the 3-position by addition to bicycloheptadiene of the halogens (also the halogenides, such, for example, as dithiocyanogen) and the hypohalous acids; of the hydrogen halides in ionizing media; of the organic acids, with or without a catalyst depending on the acid strength of the particular acid; of phenols (broadly, substances containing the OH radical attached directly to a carbon atom contained in an aromatic ring system) and alcohols in the presence of suitable catalysts; of acyl halides in the presence of catalysts; of aromatic hydrocarbons in the presence of catalysts; and of miscellaneous acidic substances of types suitably defined by the foregoing discussion.

The term generalized acid as previously used herein is sufficiently well known to require very little further discussion. It should, however, be mentioned that as herein used it refers to those particular substances which are believed, by most organic chemists, to enter into complex formation with a variety of organic halogen compounds and with carbon to carbon double bonds. The term "generalized acid" or "Lewis acid" will herein be employed to connote such compounds as aluminum chloride, ferric chloride, zinc chloride, stannic chloride, etc., or, more generally the compounds frequently denoted generically as the Friedel-Crafts catalysts including therein materials such as boron trifluoride, boron trifluoride etherate, etc.

It should also be noted that organic chemists, generally, hold the view that these substances, by forming complexes with molecules containing double bonds, lead to the formation of carbonium ions or molecular entities which react as though they were carbonium ions. It is also frequently stated that these materials are capable of entering into complexes with a variety of organic substances which, alone, are unable or but feebly able to give rise to ionic particles but which, from such complexes either do dissociate or react as though they did dissociate to form a positive ion and a complex negative ion. In consonance with this view it is commonly held that methyl chloride, for example, reacts in the presence of $Al_2Cl_6$ as though it gave rise to an $AlCl_4$ ion and a positively charged methyl ion, and similarly, that acetyl chloride under the influence of such Lewis acids reacts in the fashion which might be expected of an $AlCl_4$ ion and a positively charged acetyl ion. While the present invention is in no sense dependent on these theories and while its validity is not in any way to be assessed in terms of the correctness or accuracy which they possess or with which they have been presented, they do appear to provide a reasonable basis for the correlation of the discoveries which have resulted in the new process of this invention.

The specific conditions which were employed to carry out the process of this present invention, and the range of conditions which have been employed, are demonstrated by the examples which follow. It is of course to be understood that the examples herein contained are intended for illustrative purposes only and are not to be construed as limiting the scope of this invention.

Examples 1 to 7 illustrate methods which have been employed to prepare a variety of nortricyclene derivatives without the use of a catalyst.

EXAMPLE 1

(*Preparation of dichloronortricyclene*)

Five hundred and fifty-two grams of bicycloheptadiene contained in a round-bottomed flask was cooled to 0° C. and chlorine passed in until absorption was complete. Chlorination was then continued at room temperature and completed by placing the flask on the steam bath and introducing chlorine until there was no change in weight of the contents of the flask. The crude mixture was distilled directly, and the low-boiling portion redistilled to yield 133 grams of product boiling at 81–92° C. (11 mm.).

Analysis for $C_7H_8Cl_2$:
Calculated: C, 51.5%; H, 4.91%; Cl, 43.6%
Found: C, 50.6%; H, 5.05%; Cl, 43.7%

The nortricyclene ring structure of the above product was identified by infrared spectroscopic analysis. In addition, the usual reaction of an olefinic bond with potassium permanganate did not take place.

EXAMPLE 2

(*Preparation of 3,5-dibromonortricyclene*)

Bicycloheptadiene (184.0 gm.) was diluted with 500 cc. of carbon tetrachloride and the solution stirred while 110 cc. of bromine was added as rapidly as the uptake permitted. The reaction temperature was maintained at 10±3° by means of external cooling. The mixture took up approximately 2–3 cc. less of bromine than theory required. The black viscous liquid remaining in the flask, after removal of solvent at the water pump, was distilled and a colorless liquid was collected at 86–95° C./3.0 mm. The material was redistilled and the fraction boiling at 90–95° C./3.0 mm. was retained; yield, 272.0 gm.

Analysis for $C_7H_8Br_2$:
Calculated: Br, 63.5
Found: Br, 62.5; 63.0

The infrared spectrum showed the presence of the nortricyclene moiety.

EXAMPLE 3

(*Preparation of diiodonortricyclene*)

Four hundred and eighty grams of iodine was added to 460 grams of bicycloheptadiene, accompanied by stirring and external cooling, over a period of one-half hour. Pentane was then added to the mixture and the resulting solution washed with sodium bisulfite solution and water. The pentane solution was dried over anhydrous sodium sulfate and then distilled. Multiple fractionation yielded 230 grams of product boiling at 48–49° C. (1.0 mm.).

Analysis for $C_7H_8I_2$:
Calculated: C, 24.3%; H, 2.3%; I, 73.4%.
Found: C,    ; H,    ; I,    .

The nortricyclene ring structure was identified by infrared spectroscopic analysis.

EXAMPLE 4

(*Preparation of 3-hydroxychloronortricyclene*)

To a stirred suspension of 18.4 grams of bicycloheptadiene in 200 ml. of water containing 25 ml. of acetic acid, 70 grams of tert-butyl hypochlorite was added over a period of one hour, the temperature being maintained at that of the room by external cooling. After stirring the mixture overnight, the product was isolated by extraction with pentane and distillation; 2.6 grams (9 percent of theory based on diene) of a faintly yellow oil was obtained boiling at 60° C. (0.1 mm.).

Analysis for $C_7H_9OCl$:
Calculated: Cl, 24.5%
Found: Cl, 25.5%

The product was apparently a mixture of unsaturated and nortricyclenic compounds, since the nortricyclene structure was identified by infrared spectroscopic analysis.

EXAMPLE 5

(*Preparation of bromonortricyclene*)

Eight hundred and forty grams of 48 percent hydrobromic acid was added with stirring to 460 grams of bicycloheptadiene. The temperature was allowed to rise to 70° C., and was maintained at that point for a period of three hours by external cooling. The mixture was then cooled and the organic layer separated, washed free of acid, dried and distilled. The distilled product (453 grams), boiling at 80–90° (30 mm.), was freed of unsaturated compounds by dissolving it in 300 ml. of carbon tetrachloride and treating it with 66 grams of bromine. After one hour, the excess bromine was removed by means of sodium bisulfite solution; the organic layer was then dried over anhydrous sodium sulfate and distilled. There was obtained 292 grams of product boiling at 70° C. (18 mm.).

Analysis for $C_7H_9Br$:
    Calculated: C, 48.6%; H, 5.20%; Br, 46.2%.
    Found:      C, 48.6%; H, 4.57%; Br, 46.7%.

This product was also obtained from the reaction of bicyclo-(2.2.1)-heptene-2, with N - bromosuccinimide. Thus from 15.8 grams of bicycloheptene and 31.5 grams of N-bromosuccinimide, there was obtained by distillation 10 grams of product boiling at 65–68° C. (15 mm.).

Each of the above compounds was identified as a nortricyclene derivative by infrared spectroscopic analysis.

EXAMPLE 6

*(Preparation of 3-nortricyclyl ether of thioglycolic acid)*

Thioglycolic acid (1 mole of 80 percent solution) was mixed with bicycloheptadiene (1.5 mole). Heat was evolved on admixture and the two phased system was heated on the steam bath for 18 hours. The product was distilled to yield, after removal of a forerun, a viscous oil having a boiling point of 145° C. (0.3 mm.); $N_D^{26}$ 1.5401.

Analysis for $C_9H_{12}O_2S$:
    Calculated: C, 58.7%; H, 6.5%; S, 17.4%; molecular weight, 184
    Found:      C, 59.5%; H, 5.7%; S, 16.8%; molecular weight, 200

EXAMPLE 7

*(Preparation of nortricyclyl formate)*

Formic acid (1 mole) and bicycloheptadiene were mixed without evolution of heat and the two phase system was heated on the steam bath for 18 hours. At the end of this time, only a single phase was discernible and the material was distilled. The product was a colorless oil having a boiling point of 74–78° C. (37 mm.); $N_D^{25\ 1/2}$ 1.4731.

Analysis for $C_8H_{10}O_2$:
    Calculated: C, 69.5%; H, 7.2%
    Found:      C, 69.4%; H, 7.2%

Infrared spectroscope analysis indicated the presence of the nortricyclyl compound, and catalytic hydrogenation indicated its presence to the extent of 68%.

Examples 8 to 12 and 14 show the employment of sulfuric acid as a catalyst in the preparation of nortricyclyl derivatives according to the process of this invention.

EXAMPLE 8

*(Preparation of 3-nortricyclylacetate)*

A mixture of 46 grams of bicycloheptadiene and 120 grams of acetic acid was treated with 1 ml. of 40 percent sulphuric acid and then heated at 100° C. for a period of three hours. The product was isolated by pouring the reaction mixture into water, extracting with pentane and then distilling; 52 grams (68 percent of theory based on diene) of a colorless, mobile oil was obtained boiling at 74–76° C. (10 mm.).

The nortricyclene structure was identified by infrared spectroscopic analysis and catalytic hydrogenation indicated that the nortricyclyl compound constituted approximately 85 percent of the material present. The compound was also hydrolyzed to the corresponding monohydroxy compound, as above indicated.

EXAMPLE 9

*(Preparation of 3-nortricyclyl benzoate)*

Benzoic acid (1 mole) and bicycloheptadiene (1.25 mole) were mixed and 5 ml. of concentrated sulfuric acid then carefully added. The mixture was heated in the steam bath, under reflux for 18 hours, then cooled and taken up in ether. The solution was washed with water and the organic layer was separated and dried. The solvent was evaporated and the residual oil distilled, yielding a colorless oil, having a boiling point of 114–117° C. (0.1 mm.), $N_D^{29.5}$ 1.5421.

Analysis for $C_{14}H_{14}O_2$:
    Calculated: C, 78.5%; H, 6.6%; molecular weight, 214
    Found:      C, 78.0%; H, 6.6%; molecular weight, 222

Infrared spectroscopic analysis indicated the presence of the nortricyclyl compound.

EXAMPLE 10

*(Preparation of nortricyclyl stearate)*

Stearic acid (1 mole) and bicycloheptadiene (1.25 moles) were mixed and 6.0 ml. of conc. sulfuric acid then carefully added. The mixture turned dark and was heated on the steam bath, under reflux, for 18 hours. The heavy oil was taken up in ether and washed with water. The solvent was removed, after separating and drying the organic layer. The heavy residual oil was taken up in hexane, concentrated and stored in the refrigerator over night. The solid material which separated was filtered off. Distillation of the filtrate, after removal of solvent, yielded an oil slightly tinged with yellow, having a boiling point of 180–93° C. (0.1 mm.).

Analysis for $C_{25}H_{44}O_2$:
    Calculated: C, 79.8%; H, 11.7%
    Found:      C, 79.1%; H, 11.5%

Infrared spectroscopic analysis indicated the presence of the nortricyclyl compound.

EXAMPLE 11

*(Preparation of methoxy-nortricyclene)*

A mixture of 920 g. of bicycloheptadiene, 768 g. of methanol and 60 g. of concentrated sulfuric acid was refluxed for a period of 47 hours. The product was worked up by ether extraction and was separated from higher-boiling, di-addition material by distillation; 407 g. of material boiling at 51–57° C. (18 mm.) was obtained; $N_D^{26}$ 1.4689; molecular weight, 130 (theory, 124).

Infrared spectroscopy indicated that the product contained the nortricyclenic compound; its presence to the extent of 74 percent was shown by catalytic hydrogenation.

A small portion (10 g.) of the product was redistilled; it was found to boil at 48° C. (19 mm.); $N_D^{26}$ 1.4627.

Analysis for $C_{12}H_8O$:
    Calculated: C, 77.4%; H, 9.68%
    Found:      C, 77.2%; H, 9.73%

Infrared spectroscopy indicated that the redistilled product contained the nortricyclenic compound; its presence to the extent of 55 percent was shown by catalytic hydrogenation.

EXAMPLE 12

*(Preparation of 3-allyloxynortricyclene)*

A mixture of 92 g. of bicycloheptadiene, 232 g. of allyl alcohol, 2 ml. of concentrated sulfuric acid and 2 ml. of water was refluxed for a period of 4 hours; 2 ml. additional of concentrated sulfuric acid was added after the first two hours. The temperature of the reaction mixture remained at 84° C. throughout the period of reflux. The product was worked by ether extraction and was isolated by distillation. Redistillation of the crude product yielded 59 g. of material boiling at 75–80° C. (19 mm.).

Analysis for $C_{10}H_{14}O$:
Calculated: C, 80.0%; H, 9.35%; molecular weight, 145
Found: C, 79.8%; H, 9.24%

Infrared spectroscopy indicated that the product contained the nortricyclyl compound; its presence to the extent of 80 percent was shown by catalytic hydrogenation.

EXAMPLE 13

(*Preparation of tetrahydrofurfuryloxynortricyclene*)

A mixture of 306 g. of tetrahydrofurfuryl alcohol, 100 g. of bicycloheptadiene and 5 ml. of boron trifluoride etherate contained in a 1 liter flask fitted with a reflux condenser was heated by an electric mantle. After the temperature of the mixture had risen to 130° heating was discontinued. When the temperature rose spontaneously to 150°, cooling was applied to stop the reaction (total reaction time, 3 hours). The reaction mixture was then diluted with ether and the ethereal solution was washed successively with sodium bicarbonate solution, water and saturate sodium chloride solution. Evaporation of the ether and distillation of the residue separated the crude product from a higher-boiling, di-addition product. Redistillation of the crude material gave the pure compound amounting to 29.6 g.; boiling point of 70–82° C. (0.3 mm.); $N_D^{30}$ 1.4829.

Analysis for: $C_{12}H_{18}O_2$
Calculated: C, 74.2%; H, 9.28%; molecular weight, 194
Found: C, 74.2%; H, 8.93% molecular weight, 201

Infrared spectroscopy indicated that the product contained the nortricyclyl compound; its presence to the extent of 50 percent was shown by catalytic hydrogenation.

EXAMPLE 14

(*Preparation of 3-cyclohexyloxynortricyclene*)

A mixture of 165 g. of cyclohexanol, 100 g. of bicycloheptadiene 2 ml. of concentrated sulfuric acid and 2 ml. of water contained in a 1 liter flask equipped with a reflux condenser was heated by an electric mantle. The temperature of the reaction mixture during the initial period of reflux was 95° and it gradually rose to 125° over a period of 2¼ hours. At this point the mixture was cooled and mixed with water and the product was isolated by ether extraction and distillation of the extract; 53.5 g. of material was obtained boiling at 60–64° C. (0.3 mm.); $N_D^{32}$ 1.4875.

Infrared spectroscopy indicated the presence of the nortricyclyl structure; and catalytic hydrogenation indicated the presence of the nortricyclyl ether to the extent of 65%.

Analysis for $C_{13}H_{20}O$:
Calculated: C, 81.3%; H, 10.42%
Found: C, 81.0%; H, 10.42%

Examples 15 and 16 illustrate the use of a catalyst consisting of p-toluene sulfonic acid.

EXAMPLE 15

(*Preparation of benzyloxynortricyclene*)

A mixture of 10.8 g. (1 mole) of benzyl alcohol, 92 g. (1 mole) of bicycloheptadiene, and 4 g. of p-toluenesulfonic acid was heated on the steam bath for a period of 18 hours; the internal temperature varied from 92–94° C. The reaction mixture was then transferred to a separatory funnel and was washed successively with five 100 ml. portions of 5 percent sodium carbonate solutions and one 100 ml. portion of saturated sodium chloride solution. Distillation of the organic phase yielded 82 g. of material boiling at 85–87° C. (0.4 mm.); $N_D^{33}$ 1.5334.

Infrared spectroscopy indicated the presence of the nortricyclyl structure. Hydrogenation showed 56% of the above ether.

EXAMPLE 16

(*Preparation of phenoxynortricyclene*)

A mixture of 94 g. (1 mole) of phenol, 300 g. of bicycloheptadiene and 2 g. of p-toluenesulfonic acid was heated on a steam bath under a reflux condenser for a period of three hours. The reaction mixture was then diluted with ether and was washed successively with dilute sodium hydroxide solution, water and saturated sodium chloride solution. The ethereal solution was dried over anhydrous sodium sulfate and then distilled; the product obtained boiled at 72–75° C. (0.3 mm.) and amounted to 71 g.; $N_D^{26}$ 1.5496.

Analysis for $C_{13}H_{14}O$:
Calculated: C, 83.8%; H, 7.53%; molecular weight, 186
Found: C, 83.6%, H, 7.54%, molecular weight, 195

Infrared spectroscopy indicated that the product contained the nortricyclyl compound; its presence to the extent of 71 percent was shown by catalytic hydrogenation.

Boron trifluoride can also be employed as a catalyst for the new process of this invention. This is shown in Examples 17 to 21.

EXAMPLE 17

(*Preparation of benzyloxynortricyclene*)

A product identical with that of Example 15 was obtained by heating a mixture of 46 g. of bicycloheptadiene, 45 g. of benzyl alcohol and two drops of boron trifluoride etherate on a steam bath for a period of six hours. The product was isolated in the same manner described above; 4.5 g. of material boiling at 74–84° (0.2 mm.) was obtained; $N_D^{24}$ 1.5378.

Analysis for $C_{14}H_{16}O$:
Calculated: C, 84.0%; H, 8.02%
Found: C, 84.0%; H, 7.60%

Infrared spectroscopy indicated that the product contained the nortricyclyl structure. Hydrogenation showed 52% of the above ether.

EXAMPLE 18

(*Preparation of nortricyclyl cinnamate*)

A mixture consisting of 29.6 grams (0.2 mole) of trans-cinnamic acid, 36.8 grams (0.4 mole) of bicycloheptadiene, 200 ml. of benzene, and 10 grams of boron trifluoride-ethyl ether complex, was heated under gentle reflux for one hour with constant stirring. The product was cooled, and the benzene solution worked with water, then with soda solution, and finally with water. The product was distilled under reduced pressure, and identified as a colorless oil having a boiling point of 136–139° C. (0.2 mm.), was obtained. The yield was 37 grams (77%).

Analysis for $C_{16}H_{16}O_2$:
Calculated: C, 80.0%; H, 6.67%
Found: C, 79.5%; H, 6.71%

Infrared spectroscopic analysis indicated that the product thus obtained was in substantial part a nortricyclyl ester, determined by catalytic hydrogenation to be 40% of the product.

EXAMPLE 19

(*Preparation of 3-nortricyclyl crotonate*)

A mixture of 17.2 grams (0.2 mole) of crotonic acid, 36.8 grams (0.4 mole) of bicycloheptadiene, and one drop of boron trifluoride-diethyl ether complex was heated under reflux at 102–121° C. for 1½ hours with constant stirring. The product was cooled, washed with water, with soda solution, and finally with water, then dried and distilled under reduced pressure. The material, identified as 90% nortricyclyl crotonate was distilled over as a colorless oil at 74.5–77° C. (1.1 mm.), yield 20.2 grams (57%). $N_D^{24}$ 1.4932; neutral equation, zero.

Analysis for $C_{11}H_{14}O_2$:
Calculated: C, 79.2%; H, 7.9%
Found: C, 74.0%; H, 8.2%

Infrared spectroscopic analysis indicated the presence of the nortricyclyl compound; and catalytic hydrogenation indicated its presence to the extent of 90%.

EXAMPLE 20

(*Preparation of nortricyclyl oleate*)

A mixture of 141 grams (0.5 mole) of oleic acid, 46 grams (0.5 mole) of bicycloheptadiene, and 10 grams of boron trifluoride-diethyl ether complex was stirred at 55° for 5½ hours. The mixture was cooled, washed with water, taken up in benzene and the benzene solution washed successively with dilute soda solution and water. The benzene was removed by distillation at reduced pressure, leaving a residual oil which was fractionated in vacuo to yield 93.5 grams (50%) of a product identified as 90% nortricyclyl oleate, obtained as a pale yellow oil and having a boiling point of 200–215° C. (1.8 mm.); $N_D^{23}$ 1.4753–1.4761; neutral eq. zero.

Analysis for $C_{25}H_{42}O_2$:
Calculated: C. 80.2%; H, 11.2%; molecular weight, 374
Found: C, 78.6%; H, 11.1%; molecular weight, 340

Infrared spectroscopic analysis indicated the presence of the nortricyclyl structure; and from catalytic hydrogenation, it was concluded that the nortricyclyl ester comprised approximately 90 percent of the product thus obtained.

Examples 21, 22 and 23 illustrate the use of the so-called Lewis acids as catalysts which may be employed in carrying out the new process of this invention.

EXAMPLE 21

(*Preparation of 3-phenylnortricyclene*)

Hydrogen chloride was bubbled through a mixture of one mole benzene (78 gm.) and 2 gms. anhydrous aluminum chloride until the solution was saturated. One and one-half mole of bicyclo-[2.2.1]-2,5-heptadiene (138 gm.) was added dropwise with stirring to the above mixture which was cooled and maintained at a temperature between —7 to +15° C. for about one hour. The precipitate formed was filtered off. The filtrate was washed several times with water and diluted with 850 ml. acetone. After removing the colorless precipitate, the filtrate was reduced in volume on a steam bath and then vacuum distilled. A colorless oil was collected at 55–60° C. at 0.3 to 0.5 mm.

Analysis for $C_{13}H_{14}$:
Calculated: C, 91.8%; H, 8.2%
Found: C, 91.3%; H, 8.6%

Infrared spectroscopic analysis demonstrated the predominance of the phenylnortricyclene in the substance thus separated and from hydrogenation data it could be determined that the nortricyclenic hydrocarbon was present at least to the extent of 77%.

EXAMPLE 22

(*Preparation of 3-tolylnortricyclene*)

Dry HCl was bubbled through a mixture of 10 gm. anhydrous aluminum chloride in 184 gms. (2 moles) of toluene until a red orange oil was formed. Forty-six gms. of bicyclo (2.2.1) heptadiene (0.5 mole) was added dropwise to the above oil at a rate of 40 drops per minute at —20±2° C. with mechanical stirring. The reaction mixture was maintained at this temperature for 4 hours and poured slowly into 1500 ml. acetone which was chilled to —20 to —30° C. The mixture was stirred and allowed to come to room temperature. The precipitate formed was filtered off. The filtrate was freed of acetone and toluene under vacuum. The remaining solution was first treated with 1,000 ml. of acetone and after removal of the acetone was then treated with methanol: this procedure served to remove any insoluble material. The filtrate was reduced in volume on a steam bath, and the residue was distilled under vacuum. The fraction of material boiling at 109–111° C. (2 mm.) Hg abs. was collected. The following analysis, which indicates that it is a one to one addition product of toluene with bicycloheptadiene was obtained:

Analysis for $C_{14}H_{16}$:
Calculated: C, 91.3%; H, 8.7%
Found: C, 90.7%; H, 9.9%

Infrared spectroscopic analysis indicated the predominance of tolylnortricyclene in this product and catalytic hydrogenation showed that the product contained at least 93% of the nor-tricyclenic hydrocarbon.

EXAMPLE 23

(*Preparation of 3-chloro-5-acetylnortricyclene*)

Ten ml. anhydrous $SnCl_4$ was added dropwise to a mechanically stirred solution of 368 gm. bicyclo (2.2.1) heptadiene, in 400 ml. acetyl chloride. At 55° C., after about half the catalyst was added, a vigorous reaction commenced and continued exothermically: the solution became dark and intermittent cooling was required. The remaining catalyst was added dropwise after the violent reaction subsided. The additions of $SnCl_4$ required a total of one hour. The reaction mixture was then heated to 75–85° C. for three hours. After cooling the reaction mixture to room temperature, 600 ml. water was added to the mixture to destroy the excess acetyl chloride and the catalyst. The mixture was extracted portionwise with 1300 ml. pentane and the extract was dried over anhydrous $Na_2SO_4$, vacuum distilled and then refractionated through a Todd column. 3-acetyl-5-chloro-nortricyclene was obtained in very pure state at 78–83° C. (0.1 mm.). Its structure was proven by analysis and infrared spectroscopy.

Analysis for $C_9H_{11}OCl$:
Calculated: C, 63.3%; H, 6.45%; Cl, 20.8%.
Found: C, 63.3%; H, 6.48%; Cl, 21.0%.

Hydrogenation showed that the product was wholly nor-tricyclenic.

Using $ZnCl_2$ as a catalyst instead of $SnCl_4$, substantially identical results were obtained.

It will, of course, be at once evident that the procedures thus illustrated in the foregoing examples can be utilized to produce a large number of nor-tricyclenic compounds and those skilled in the art will now, as a result of this disclosure, be able to select the conditions best suited for each specific reactant to be employed. Using conditions essentially similar to those which have already been detailed, it has been possible to produce hydroxy-nor-tricyclene by the direct reaction of bicycloheptadiene with water; mono and di-nor-tricyclyl esters of both saturated and unsaturated dibasic acids have been prepared using this process. Similarly, the nor-tricyclyl ethers and esters of hydroxy acids have been brought into existence.

It should also be noted that the route to nor-tricyclic compounds which the present new process makes available is not limited to the obtainment of those compounds which result on the addition of reagents to bicycloheptadiene. These latter derivatives will undergo the usual reactions of organic compounds, already well known, leading, as a result to a large number of nor-tricyclenic derivatives which are not necessarily directly produced by the addition process already set forth.

It would be unduly space consuming to delineate all of the procedures which have proved of value in converting the primary nor-tricyclenic derivatives, prepared as already described, to other such compounds not otherwise available and, since, skilled chemists will readily recognize how such transformations can be brought about, unnecessary to do so. Accordingly, Examples 24 and 25 are here included only to illustrate the ease with which such further reactions can be carried out.

EXAMPLE 24

(*Preparation of diacetoxy-nor-tricyclene from diiodo-nor-tricyclene*)

A mixture of 277 grams of 3,5-diiodonortricyclene prepared as in Example 3, 400 grams of sodium acetate and 800 ml. of acetic acid, was refluxed for a period of eight days. The mixture was then poured into water and the product extracted with ether. The ethereal extract was freed of acid and distilled; 63.4 grams of product boiling at 93–96° C. (1.1 mm.) was realized. The distillate crystallized upon standing, and after recrystallization from methanol was found to melt at 107.5–109° C.

The presence of the nortricyclene ring structure was confirmed by infrared spectroscopic analysis.

EXAMPLE 25

(*Preparation of dihydroxy-nor-tricyclene from diacetoxy-nor-tricyclene*)

Twenty-one grams of the diacetate of Example 25 was hydrolyzed by refluxing in methanol containing hydrogen chloride, and azeotropically removing the methyl acetate formed in the reaction. When the reaction had ceased the acid was neutralized with ammonia and the solvent removed in vacuo. The residue was crystallized from ethyl acetate to yield 6.2 grams of product melting at 161.5–163° C.; recrystallization from the same solvent gave the pure compound melting at 167.5–168° C.

Analysis for $C_7H_{10}O_2$:
Calculated: C, 66.6%; H, 7.99%
Found: C, 66.4%; H, 7.90%

The presence of the nortricyclene structure was shown by infrared spectroscopic analysis, while the above diol was converted to the di-p-nitrobenzoate by normal methods.

It has been found that the new process of this invention is particularly advantageous for the preparation of the parent hydrocarbon, nor-tricyclene, since the direct addition of a number of reagents, such, for example, as the hydrogen halides in aqueous solution, give rise to derivatives of that hydrocarbon which can very readily be reduced to the parent substance.

It is not surprising that the reactions which yield nor-tricyclene derivatives can, at the same time, produce by-products since this is a general characteristic of most organic reactions. In the case under discussion, two types of by-products are worthy of specific mention.

In the first instance, it has been found that the unexpected rearrangement products may be accompanied by varying amounts of the normal addition products which are, as already noted, bicycloheptene and bicycloheptane derivatives. The latter compounds, since they are necessarily heavier molecules than the desired nor-tricyclenes, are readily separable. The bicycloheptene derivatives are unsaturated, and by taking advantage of this fact, separation of the bicycloheptene by-products can be effected. Such a separation has already been illustrated in Ex. 5, and the procedures therefor need not be further discussed. Many modifications of the specific procedures there illustrated and many similar separation procedures will readily be evident to the skilled chemist.

It should, however, be noted that the cyclopropane ring in the nortricyclene derivatives appears to be susceptible to attack by acidic reagents, although less so than the double bonds in bicycloheptadiene and bicycloheptene. In contrast, the same cyclopropane ring appears to be relatively inert to the halogens.

The new compounds which can now be prepared as a result of the invention here disclosed are capable of undergoing a variety of reactions which lead to the formation of useful organic substances and these new compounds are valuable intermediates for such syntheses. They are useful as intermediates in the preparation of insecticides, fungicides and pharmaceuticals. They can also be employed either directly as, or as starting materials for further syntheses of highly stable high boiling liquids and plasticizers.

Many of the compounds which may be produced by the method of this invention are disclosed and claimed in the copending applications of Milton Silverman et al., Ser. No. 237,842, filed July 20, 1951, entitled "Nortricyclene and Method of Producing the Same," and of Barney Soloway et al., Ser. No. 237,845, filed July 20, 1951, now abandoned, entitled "Monosubstituted Nortricyclene Derivatives"; of Abe A. Danish et al., Ser. No. 237,841, filed July 20, 1951, now abandoned, entitled "Disubstituted Nortricyclene Derivatives"; of Henry Bluestone et al., Ser. No. 237,843, filed July 20, 1951, entitled "Nortricyclyl Ethers"; and of Barney Soloway et al., Ser. No. 237,846, filed July 20, 1951, now abandoned, entitled "Nortricyclyl Esters."

It is, of course, to be understood that the skilled chemist will, with this full disclosure available to him, readily perceive many minor modifications and extensions of the process herein discussed. All of these which lie within the spirit and scope of this disclosure are properly comprehended thereby and a part of this invention. The many specific examples herein set forth are illustrative only and are not to be construed as limiting the scope of this invention which is, in fact, to be limited only by the claims appended hereto.

What is claimed is:

1. A process for preparing compounds containing the nor-tricyclene nucleus which in planar structural representation is

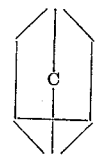

which comprises reacting bicyclo-(2.2.1)-heptadiene with a material that adds to double bonds and is selected from the group consisting of halogens, hydrogen halides, carboxylic acids, alcohols, phenols, aromatic hydrocarbons and carboxylic acid halides.

2. A process as defined in claim 1, wherein the reaction is carried out at a temperature in the range of approximately −20° C. to 150° C.

3. A process for preparing a compound containing the nortricyclene nucleus, which comprises reacting bicyclo-(2.2.1)-heptadiene with a carboxylic acid in the presence of a strong acid catalyst.

4. A process as defined in claim 3, wherein said carboxylic acid is sufficiently strong to act as its own catalyst.

5. A process as defined in claim 3, wherein said carboxylic acid is unsaturated.

6. A process for preparing a compound containing the nortricyclene nucleus, which comprises reacting bicyclo-(2.2.1)-heptadiene with an alcohol in the presence of a strong acid catalyst.

7. A process as defined in claim 6, wherein said alcohol is unsaturated.

8. A process for preparing a compound containing the nortricyclene nucleus, which comprises reacting bicyclo-(2.2.1)-heptadiene with carboxylic acid halide, in the presence of a Friedel-Crafts catalyst.

9. A process for preparing a compound containing the nortricyclene nucleus, which comprises reacting bicyclo- (2.2.1)-heptadiene with an aromatic hydrocarbon, in the presence of a Friedel-Crafts catalyst.

10. A process for preparing 3-chloro-5-acetyl-nor-tricyclene which comprises reacting bicyclo-(2.2.1)-2,5-heptadiene with acetyl chloride in the presence of stannic chloride as a catalyst, the reaction being effected at a temperature ranging from approximately 50° C. to approximately 90° C. in an excess of acetyl chloride as the solvent, and separating the desired 3-chloro-5-acetyl-nor-tricyclene from the reaction mixture thus obtained.

11. A process as defined in claim 1, wherein the reaction is carried out in an excess of one of the reactants as the reaction solvent.

12. A process for preparing 3-phenyl-nor-tricyclene which comprises reacting bicyclo-(2.2.1)-2,5-heptadiene with benzene saturated with anhydrous hydrogen chloride in the presence of aluminum chloride as a catalyst at a temperature of approximately −20° C. and separating the desired phenyl-nor-tricyclene from the reaction mixture so obtained.

13. A process for preparing a product containing the nor-tricyclene nucleus, which comprises reacting bicyclo-(2.2.1)-heptadiene with acetyl chloride in the presence of a Friedel-Crafts catalyst.

14. A process for preparing a reaction product comprising chloro acetyl nor-tricyclene which comprises reacting bicyclo-(2.2.1)-2,5-heptadiene with acetyl chloride in the presence of a Friedel-Crafts catalyst at a temperature within the range of from about 0° C. to about 150° C.

References Cited in the file of this patent

UNITED STATES PATENTS

| | | |
|---|---|---|
| 2,393,610 | Bruson | Jan. 29, 1946 |
| 2,395,454 | Bruson | Feb. 26, 1946 |